US008645352B2

(12) United States Patent
Van Der Linden (10) Patent No.: US 8,645,352 B2
(45) Date of Patent: Feb. 4, 2014

(54) FOCUSED SEARCH USING NETWORK ADDRESSES

(75) Inventor: Maura Adana Van Der Linden, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 11/289,832

(22) Filed: Nov. 30, 2005

(65) Prior Publication Data

US 2007/0124307 A1 May 31, 2007

(51) Int. Cl.
*G06F 17/30* (2006.01)

(52) U.S. Cl.
USPC ........... 707/708; 707/726; 707/770; 707/771; 707/758

(58) Field of Classification Search
USPC .......................... 707/708, 826, 770, 771, 758
See application file for complete search history.

(56) References Cited

U.S. PATENT DOCUMENTS

| | | | | |
|---|---|---|---|---|
| 5,941,944 | A * | 8/1999 | Messerly | 707/3 |
| 6,009,423 | A * | 12/1999 | Moran | 707/5 |
| 6,223,145 | B1 * | 4/2001 | Hearst | 707/3 |
| 6,304,864 | B1 | 10/2001 | Liddy et al. | |
| 6,363,377 | B1 * | 3/2002 | Kravets et al. | 707/999.004 |
| 6,477,577 | B1 | 11/2002 | Asano | |
| 6,516,311 | B1 * | 2/2003 | Yacoby et al. | 707/999.004 |
| 6,567,797 | B1 * | 5/2003 | Schuetze et al. | 707/2 |
| 6,615,237 | B1 | 9/2003 | Kyne et al. | |
| 6,647,381 | B1 * | 11/2003 | Li et al. | 707/999.004 |
| 6,961,731 | B2 * | 11/2005 | Holbrook | 707/102 |
| 2001/0039546 | A1 * | 11/2001 | Moore et al. | 707/10 |
| 2002/0165856 | A1 * | 11/2002 | Gilfillan et al. | 707/3 |
| 2004/0162916 | A1 * | 8/2004 | Ryan | 709/245 |
| 2005/0114324 | A1 * | 5/2005 | Mayer | 707/3 |

FOREIGN PATENT DOCUMENTS

| | | |
|---|---|---|
| CN | 1417709 A | 5/2003 |
| DE | 10360686 | 8/2005 |
| EP | 1182842 | 2/2002 |
| JP | 2003058552 | 2/2003 |
| RU | 2249303 C2 | 3/2005 |
| WO | WO2007064440 A1 | 6/2007 |

OTHER PUBLICATIONS

Google Guide: Similar Pages, dated Apr. 13, 2004 by Internet Archive; http://web.archive.org/web/20040413034307/http://www.googleguide.com/similar_pages.html.*
Screen shots of Microsoft® Internet Explorer® (IE has copyright dates 1997-2004).*
Microsoft Internet Explorer picture of the right click menu on a link.*
"Amazing Search Techniques You Cannot Miss; Hacks by Google Experts", PC fan Jul. 1, 2004, vol. 11, No. 12, pp. 90-101.
Translated Japanese Office Action mailed Apr. 13, 2012 for Japanese patent application No. 2008-543294, a counterpart foreign application of U.S. Appl. No. 11/289,832, 3 pages.

(Continued)

*Primary Examiner* — Debbie Le
(74) *Attorney, Agent, or Firm* — Lee & Hayes, PLLC (57) ABSTRACT

Embodiments of search using network addresses are presented herein. For example, a search may take into account one or more network addresses to focus a search for particular content. In another example, functionality may be provided such that when a user selects a network address, a search is performed for network addresses that are similar to the selected address.

20 Claims, 8 Drawing Sheets

(56) References Cited

OTHER PUBLICATIONS

Nemoto, "Clear and Simple Cram School for Utilizing Digital Technology", Nikkei Zero One, May 1, 2005, vol. 107, pp. 144-145.
"Useful Software Available to Business", PC Mode, vol. 10, No. 5, May 24, 2005, p. 46.
Translated Chinese Office Action mailed May 31, 2011 for Chinese patent application No. 20068004423.8, a counterpart foreign application of U.S. Appl. No. 11/289,832.
The European Office Action mailed Aug. 7, 2012 for European patent application No. 06836850.5, a counterpart foreign application of U.S. Appl. No. 11/289,832, 6 pages.
Fu, et al., "Mining Navigation History for Recommendation", ACM 2000, New Orleans, LA, pp. 106-112.
"SEFHTML Forumsarchiv", published Jul. 30, 2002, http://forum.de.selfhtml.org/archiv/2002/7/t16048/ 4 pages.
Anonymous, "Frequently Asked Questions—The Wayback Machine", Nov. 29, 2005, pp. 1-27, retrieved from the internet at http://web.archive.org/web/20051129090414/http://www.archive.org/about/faqs/php, retrieved on Dec. 13, 2011.
Anonymous, "What's Related FAQ", Nov. 2, 2005, pp. 1-5, retrieved from the internet at http://web.archive.org/web/20051102065725/http://wp.netscape.com/escapes/related/faq.html, retrieved on Dec. 12, 2011.
Dean, et al., "Finding Related Pages in the World Wide Web", Computer Networks, Elsevier Science Publishers B.V., Amsterday, NL, vol. 31, No. 11-16, May 17, 1999, pp. 1467-1479.
The Extended European Search Report mailed Dec. 23, 2011 for European patent application No. 06836850.5, 10 pages.
The European Office Action mailed Feb. 19, 2013 for European patent application No. 06836850.5, a counterpart foreign application of U.S. Appl. No. 11/289,832, 6 pages.
Translated Japanese Office Action mailed Nov. 20, 2012 for Japanese patent application No. 2008-543294, a counterpart foreign application of U.S. Appl. No. 11/289,832, 4 pages.
"Report on How to Utilize Windows", PC Mode, Nov. 24, 2004, vol. 9, No. 11, pp. 134-137.
"Techniques for Collecting Information from a Network", Netrunner, Apr. 1, 2005, vol. 7, No. 4, pp. 180-187.
Harada, "Thorough Utilization of Search Engines", Ohm Sha, Dec. 24, 1997, pp. 40-48.
Japanese Office Action mailed Jun. 20, 2013 for Japanese patent application No. 2008-543294, a counterpart foreign application of U.S. Appl. No. 11/289,832, 4 pages.

\* cited by examiner

FOCUSED SEARCH USING NETWORK ADDRESSES

BACKGROUND

Users have access to a vast amount and variety of content via the Internet. For example, a user may access web sites to download songs, receive software, and so on. Because of the amount of content that is available, users may interact with a search service (otherwise known as a "search engine") to locate and navigate to particular content of interest that is available via the respective web sites.

To help the users locate desired content, search services typically maintain databases of information which describe the web sites. The databases may be indexed such that the users may locate desired content via a search query, which may be provided as a textual input. However, because there is such a vast amount of content, search results provided to the users may also include a large amount of data. For example, a user desiring to learn additional information about cars (e.g., new cars and reliability reports), sports (e.g., football and baseball), and so on, may receive search results that include thousands of links to thousands of web sites. Therefore, to locate a particular web site of interest, the user typically navigates through a significant number of links to the web sites to locate a particular web site of interest, which may be both time consuming and inefficient.

SUMMARY

Techniques are described in which a search may be focused based on a network address. For example, a search may take into account one or more network addresses, such as network addresses specified as "favorites" in a browser, to focus a search for particular content. In another example, functionality may be provided such that when a user selects a network address, such as by "right clicking" a link, a search is performed for network addresses that are similar to the selected address. A variety of other examples are also contemplated without departing from the spirit and scope thereof.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Because of the vast amount of content that is available over the Internet, search results for particular content of interest may become quite voluminous. Accordingly, techniques are described which may leverage network addresses to focus the search results. For example, a user may specify a collection of network addresses as "favorites" in a drop-down menu of a browser. These network addresses and the content that is available via the network addresses may then be utilized to focus search results for a search query. Thus, the network addresses may be used to give a context to the search query. Further discussion of network address focused searching may be found in relation to FIGS. 3-6.

In another example, the network addresses are selectable to cause a search to be performed for similar network addresses or addresses with similar content. A user, for instance, may "right click" on a network address to cause a menu to be displayed. The menu may include an option to "Search for Similar Pages" that, when selected, causes a search to be performed for network addresses having content that is similar to that network address. Further discussion of network addresses that are selectable to cause a search to be performed may be found in relation to FIGS. 7-9.

In the following discussion, an exemplary environment is first described which is operable to employ techniques to provide network address focused searching. Exemplary procedures and user interfaces are then described which are operable in the exemplary environment to provide the techniques, as well as in other environments.

Exemplary Environment

Figure 1:
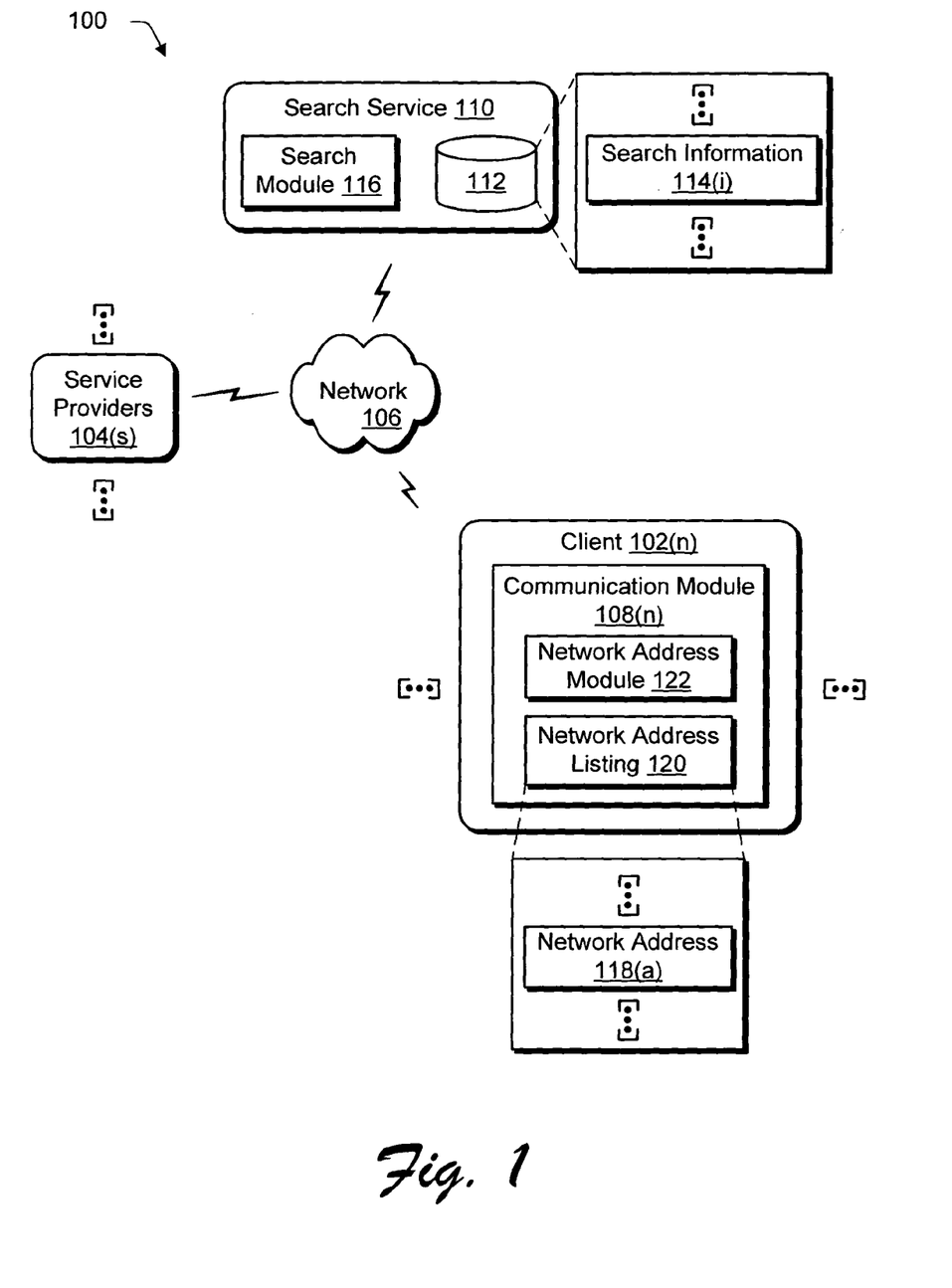
FIG. 1 is an illustration of an environment in an exemplary implementation that is operable to employ network address focused search techniques.

FIG. 1 is an illustration of an environment 100 in an exemplary implementation that is operable to employ network address focused search techniques. The environment 100 is illustrated as including a plurality of clients 102(*n*) (where "n" can be any integer from one to "N") that are communicatively coupled to one or more service providers 104(*s*) (where "s" can be any integer from one to "S") over a network 106.

The plurality of clients 102(*n*) may be configured in a variety of ways. For example, one or more of the clients 102(*n*) may be configured as a computer that is capable of communicating over the network 104, such as a desktop computer, a mobile station, a game console, an entertainment appliance, a set-top box communicatively coupled to a display device, a wireless phone, and so forth. The clients 102(*n*) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(n) may also relate to a person and/or entity that operate the client. In other words, the clients 102(n) may describe a logical client that includes a user, software and/or a machine.

Additionally, although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, a collection of the plurality of clients 102(n) may be coupled via a peer-to-peer network to communicate, one to another. Each of these clients may also be communicatively coupled to the service providers 104(s) over the Internet. A variety of other examples are also contemplated.

Each of the plurality of clients 102(n) is illustrated as including a respective one of a plurality of communication modules 108(n). In the illustrated implementation, each of the plurality of communication modules 108(n) is executable on a respective one of the plurality of clients 102(n) to communicate over the network 106. For example, communication module 108(n) may be configured as a browser that is executable to navigate to and view content available from the service providers 104(s) over the network 106.

To locate content, the communication module 108(n) may be configured to communicate with a search service 110 over the network 106. As previously described, the search service 110 may maintain a database 112 containing a plurality of search information 114(i) (where "i" can be any integer from one to "I") that describes web sites. The search information 114(i) may be indexed such that particular web sites may be located.

The communication module 108(n), for example, when executed may communicate with the search service 110, and more particularly a search module 116 of the search service 110, to provide a search query to locate one or more service providers 104(s) of interest. The search module 116 may then be executed by the search service 110 to examine the search information 114(i) and locate that information, if any, that corresponds to the search query. A search result containing this search information 114(i) may then be communicated back over the network 106 to the client 102(n) for display.

As previously described, however, the search results may include a vast amount of information. Accordingly, in order to improve a context of the search information such that the likelihood that the search results include search information 114(i) that is of interest of the client 102(n), the search results may be focused based on network addresses 118(a) (where "a" can be any integer from one to "A") that are potentially of interest to the client 102(n). For example, the network addresses 118(a) may be stored locally on the client 102(n) to provide a variety of functionality. In the illustrated instance, the network addresses 118(a) are stored as a part of a network address listing 120. One or more of the network addresses 118(a) in the listing are specified manually on the client 102(n), such as through inclusion of the network address in a list of "favorites" of a browser. Therefore, these "favorites" may give a context of content, with which, the client 102(n) typically interacts. A variety of other instances are also contemplated, such as inclusion of the network addresses 118(a) in documents stored on the client 102(n), in other application modules of the client 102(n), and so on, further discussion of which may be found in relation to FIG. 2.

The communication module 108(n) is further illustrated as including a network address module 122. The network address module 122 is representative of functionality that leverages the network addresses 118(a). For example, the network address module 122, when executed, may append a listing of network addresses 118(a) to a search query for communication to the search service 110. In this example, the search service, and more particularly the search module 116, may leverage the network addresses 118(a) when performing one or more searches to locate content that has a greater likelihood of being "of interest" to the client 102(n). In another example, the network address module 112 processes the search results based on the network addresses 118(a). For instance, the network address module 122 may receive search results from the search service 110 and process those results using the network addresses 118(a). A variety of other examples are also contemplated.

It should be noted that although the following discussion describes the use of a search service 110 to locate content from service providers 104(s) over the network 106, similar functionality may also be employed to locate content that is stored locally on the client 102(n). Therefore, although the following discussion will describe the search for "network" content, it should be readily apparent that these techniques are equally applicable to searches for "local" content, e.g., content stored locally on the client 102(n).

Generally, any of the functions described herein can be implemented using software, firmware (e.g., fixed logic circuitry), manual processing, or a combination of these implementations. The terms "module", "functionality" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the network address focusing techniques described below are platform-independent, meaning that the techniques may be implemented on a variety of commercial computing platforms having a variety of processors.

Figure 2:
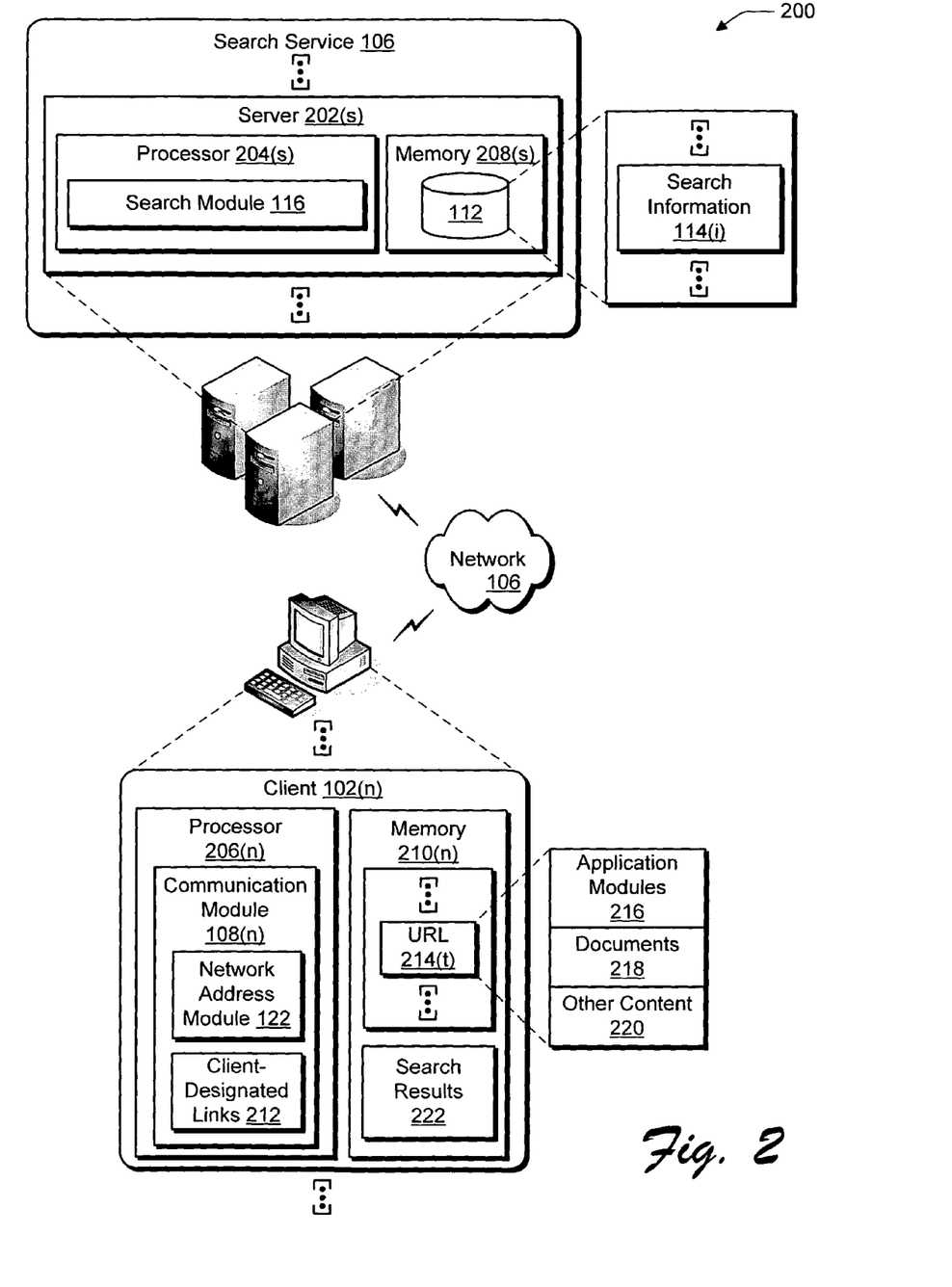
FIG. 2 is an illustration of a system in an exemplary implementation showing a plurality of clients and a search service of FIG. 1 in greater detail.

FIG. 2 is an illustration of a system 200 in an exemplary implementation showing the plurality of clients 102(n) and the search service 110 of FIG. 1 in greater detail. The search service 106 is illustrated as being implemented by a plurality of servers 202(a) (where "a" can be any integer from one to "S") and the client 102(n) is illustrated as a client device. The servers 202(s) and the client 102(n) are each illustrated as having a respective processor 204(s), 206(n) and a respective memory 208(s), 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(s), 210(n) is shown, respectively, for the servers 202(s) and the clients 102(n), a wide variety of types and combinations of memory may be employed, such as random access memory (RAM), hard disk memory, removable medium memory, and so forth.

As previously described in relation to FIG. 1, the network addresses 118(a) stored locally on the client 102(n) of FIG. 1 may be implemented in a variety of different ways. For example, the communication module 108(n), when implemented as a browser, may include a menu of client-designated links 212 which are "favorites" of the client 102(n). The client-designated links 212 are selectable to cause the browser to navigate to the corresponding links in order to retrieve content, such as web pages and so on. Thus, these designated links indicate content, with which, the client 102(n) typically interacts over the network 106.

A variety of other network addresses may also be stored locally on the client 102(n), an example of which is the plurality of uniform resource locators (URLs) 214(t) that are illustrated as stored in the memory 210(n) of the client 102(n). For instance, the URLs 214(t) may be utilized by other application modules 216 (e.g., to navigate and retrieve content from particular web sites), incorporated within documents 218 (e.g., links to specific network addresses included in a word processing document, spreadsheet, etc.), and so on. Thus, each of these other instances may also give a context to the types of content are typically encountered and sought out by the client 102(n).

The network address module 122 is illustrated as being executed on the processor 206(n) and is storable in memory 210(n). The network address module 122 is representative of functionality to leverage network addresses with search. For example, the network address module 122 may automatically communicate the network addresses (e.g., client-designated links 212, URLs 214(t), and so on) with a search query to the search service 106. The search service 106 may then utilize the network addresses to give a context to the search, such as to configure the search results, perform additional searches using information obtained using the network addresses, and so on.

In another example, the functionality employed by the network address module 122 to focus the search is employed on the client 102(n) itself. For instance, the client 102(n) may process search results 222 obtained from the search service 106 in response to the search query, such as to reconfigure the search results 222 for output. Further discussion of techniques that are employable to focus search results may be found in relation to FIGS. 3-6.

In yet another example, the network address module 122 is executable to provide automatic searches from a network address. The client 102(n), for instance, may receive an input which selects a network address. In response to the selection, a search may be automatically performed for network addresses having similar content to that which is available via the selected network address. Therefore, in this instance the client 102(n) may perform a search for related content without requiring manual entry of the network address as a search query, further discussion of which may be found in relation to FIGS. 7-9.

Exemplary Procedures

The following discussion describes network address search techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
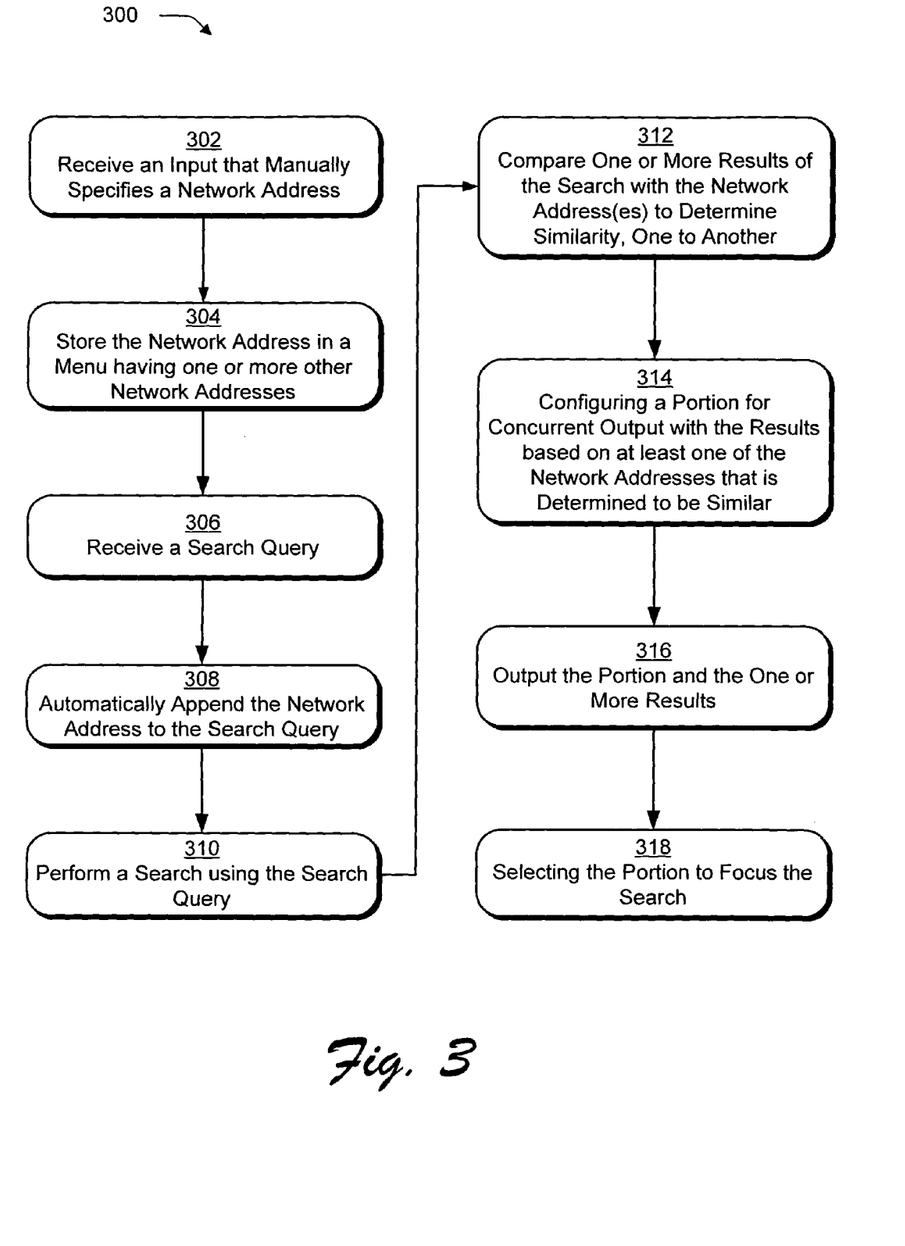
FIG. 3 is a flow diagram depicting a procedure in an exemplary implementation in which a network address manually specified by a user is utilized to configure a user interface having search results of a search query.

FIG. 3 depicts a procedure 300 in an exemplary implementation in which a network address manually specified by a user is used to configure a user interface having search results of a search query. In the following discussion of FIG. 3, reference will also be made to the user interfaces 400 and 500 of respective FIGS. 4 and 5.

Figure 4:
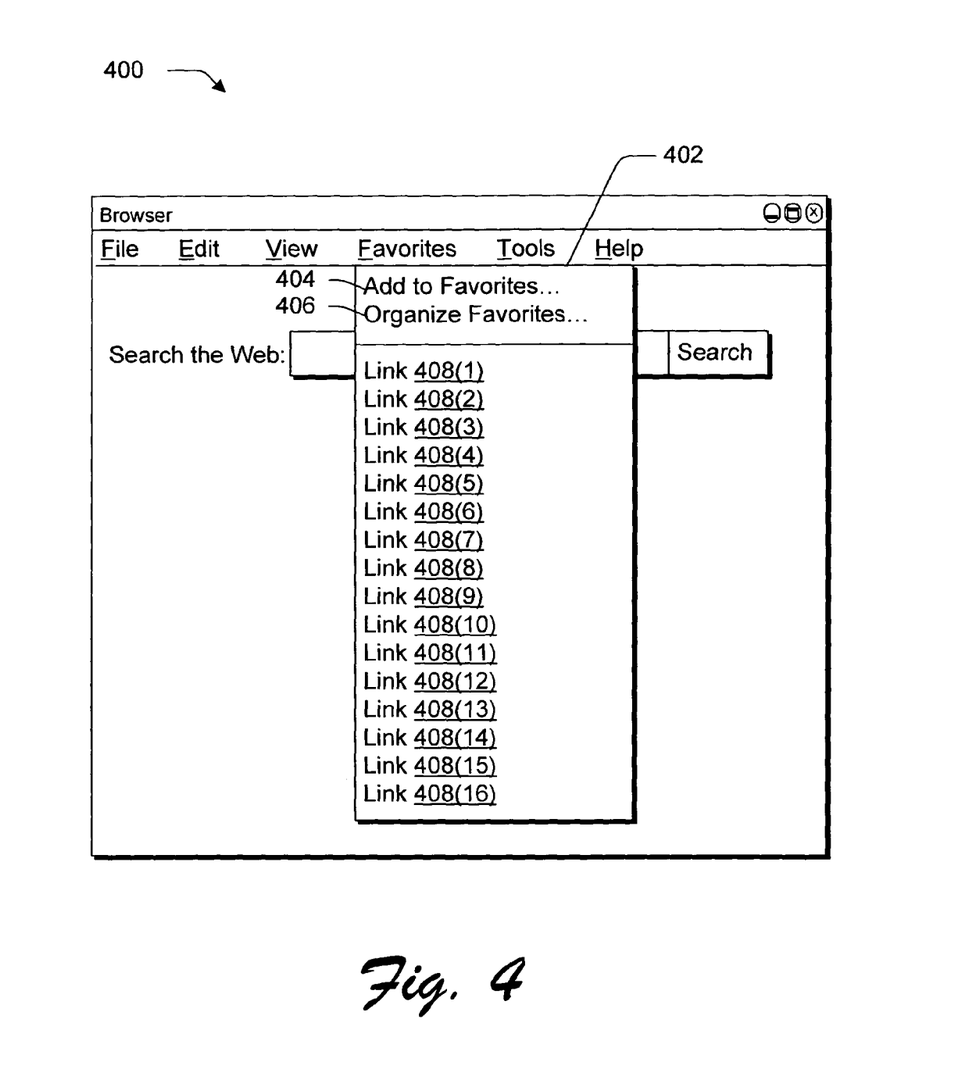
FIG. 4 is an illustration of a user interface in an exemplary implementation showing a drop-down menu in a browser having a plurality of "favorite" links that are selectable to navigate to corresponding network addresses.

An input is received that manually specifies a network address (block 302). For example, as shown in FIG. 4, the user interface 400 and communication module 108(n) may be configured as a browser. The user interface 400 in the illustrated example includes a menu bar having selectable commands which include "file", "edit, "view", "favorites", "tools" and "help". The command "favorites" is illustrated as selected, which causes a respective drop-down menu 402 to be displayed. The menu 402 also includes sub-commands related to that menu, which are illustrated as "add to favorites" 404 and "organize favorites" 406.

The "add to favorites" command 404 is selectable to add links to this menu 402 such that the client 102(n) may easily navigate to desired content without having to manually enter the respective network addresses represented by the respective links 408(1)-408(16). For example, an input may be received that selects link 408(1), which causes the communication module 108(n) (in this instance is configured as a browser) to navigate to the corresponding network address and retrieve content from that address, e.g., a web page. Therefore, the links 408(1)-408(16) represent particular network locations, with which, the user typically interacts.

Although manual inclusion of network addresses within the drop-down menu 402 has been described, one or more of the links 408(1)-408(16) may also be specified automatically, e.g., during installation of software on the client 102(n). In this example, the network address is also indicative of the contextual category of content, with which, the user interacts. For example, the software which caused the automatic installation of the link on the client 102(n) may be presumed to have done so with the knowledge of a user of the client 102(n), the software itself is indicative of how the client 102(n) will be utilized, and so on. Although two examples have been described, the network addresses may be stored in the menu (block 304) in a variety of other ways without departing from the spirit and scope thereof.

Figure 5:
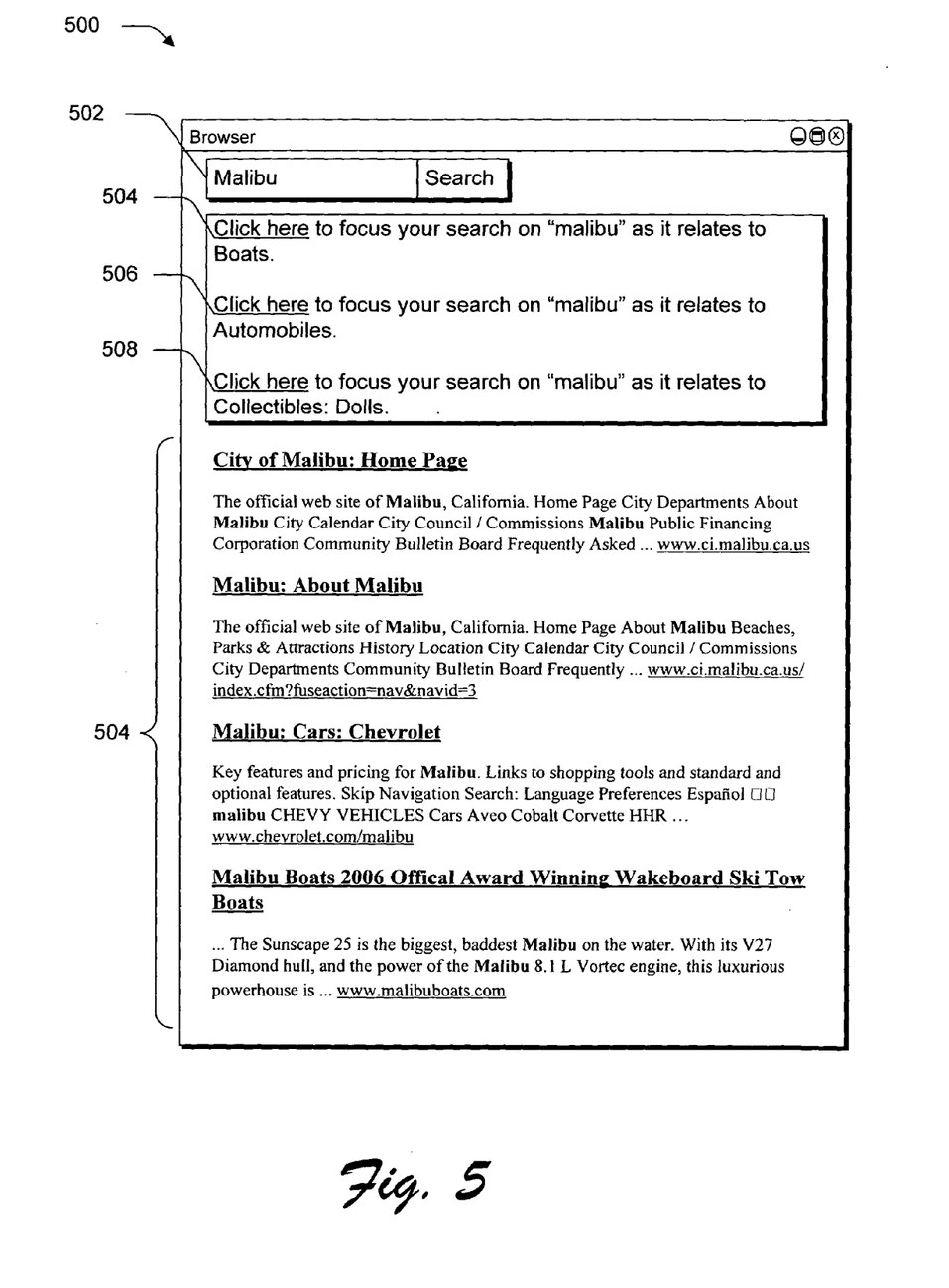
FIG. 5 is an illustration of a user interface in an exemplary implementation showing concurrent display of a plurality of search results and a plurality of portions that are selectable to focus the search results.

A search query is received (block 306). For example, the user interface 500 of FIG. 5 is illustrated as outputting a web page having a search window 502. The search window 502 is configured to accept text input by a user that is to be used as a search query, which in this instance is illustrated as the text "Malibu".

Upon receipt of the search query (e.g., by selecting "search" after entry of the search query), the network address is automatically appended to the search query (block 308) for transfer over the network 106 to the search service 110. For example, the network address module 122, when executed, may form a communication which includes the search query and the network address that was manually specified (block 302). This communication may then be transmitted over the network 106 for processing by the search module 116 of the search service 110.

A search is performed using the search query (block 310), the results of which are then compared with the network addresses to determine similarity, one to another (block 312). For instance, the search module 116 may examine the search information 114(i) using the search query "Malibu" to locate web sites 504 (i.e., the search results) having content that is related to the query. The search module 116 may then compare the results with content that is available from the links in the client's 102(n) "favorites" to determine similarity, one to another.

A portion is then configured for concurrent output with the one or more results based on one or more network addresses that are determined to be similar (block 314). For example, similarities determined between content referenced by the search results with content available via the links 408(1)-408(16) may be used to create portions 504, 506, 508 that are representative of contextual categories of content. In other words, the portions 504-508 may represent categories of content similarity found in the search results and the network addresses.

Links 408(1)-408(16), for instance, may reference websites that have content related to "boats", "automobiles" or "dolls". Search results for the search query "Malibu" may be related to "boats", "automobiles", "dolls", or the "city of Malibu". Therefore, a determination is made by the search module 116 when analyzing the links 408(1)-408(16) to include portions that are selectable to focus the search into these similar contextual categories, e.g., "boats", "automobiles" and "dolls".

The portion and the one or more results are then output (block 316). As shown in FIG. 5, for instance, the search results 504 obtained without using the network addresses (e.g., just the search query) are output along with the portions 504, 506, 508 that are selectable to focus the search using the network addresses. In this way, the client 104(*n*) may output search results that are unaffected by the network address processing, along with links to obtain such processing should it be desired. For example, an input may be received (e.g., a mouse "click") that selects a portion (e.g., portions 504-508) to focus the search (block 318). This focusing causes another search to be performed using the search query and the similar contextual category as determined from the network addresses. Therefore, the client 102(*n*) is given a choice as whether to utilize this functionality and may do so without manually reentering the search query. A variety of other techniques may also be utilized to focus the search results, another example of which may be found in relation to the discussion of the following figure.

Figure 6:
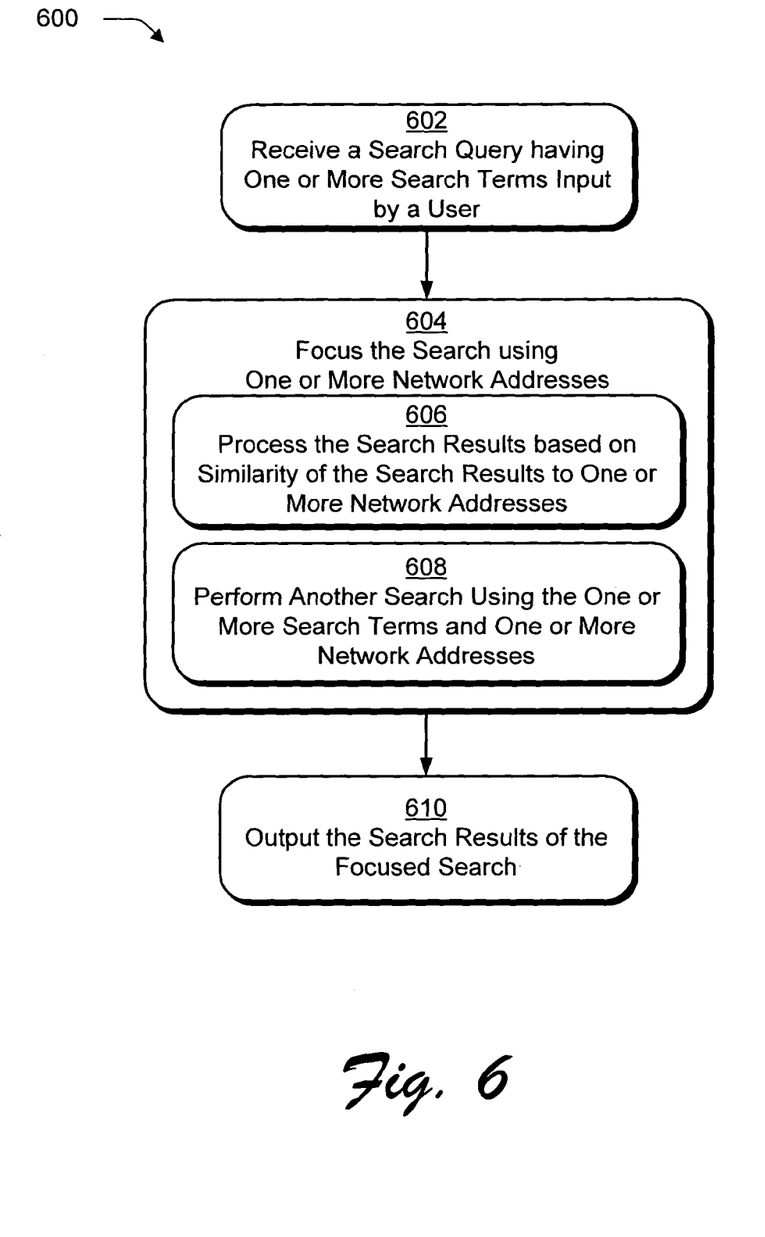
FIG. 6 depicts a procedure in an exemplary implementation in which a search is focused based on one or more network addresses.

FIG. 6 depicts a procedure 600 in an exemplary implementation in which a search a focused based on one or more network addresses. A search query is received having one or more search terms input by a user (block 602). For example, the user may input a text string using an input device (e.g., a keyboard) to locate content of interest, such as content that is available remotely from service providers 104(*s*) over the network 106, content that is available locally on the client 102(*n*) itself, and so on.

The search is then focused using one or more network addressed (block 604). For example, as previously described in relation to FIG. 5, the search results may be processed based on similarity of the search results to one or more network addresses (block 606). In another example, another search may be performed using the one or more search terms and one or more network addresses (block 608). For instance, a search for items that are stored locally on the client 102(*n*) may first be performed using the search query, and then one or more other searches may then be performed using the search query and contextual categories determined from network addresses stored locally on the client 102(*n*). Each of these separate searches may be grouped into categories for display in the user interface as shown in FIG. 5. A variety of other instances are also contemplated. The search results of the focused search are then output (block 610).

Figure 7:
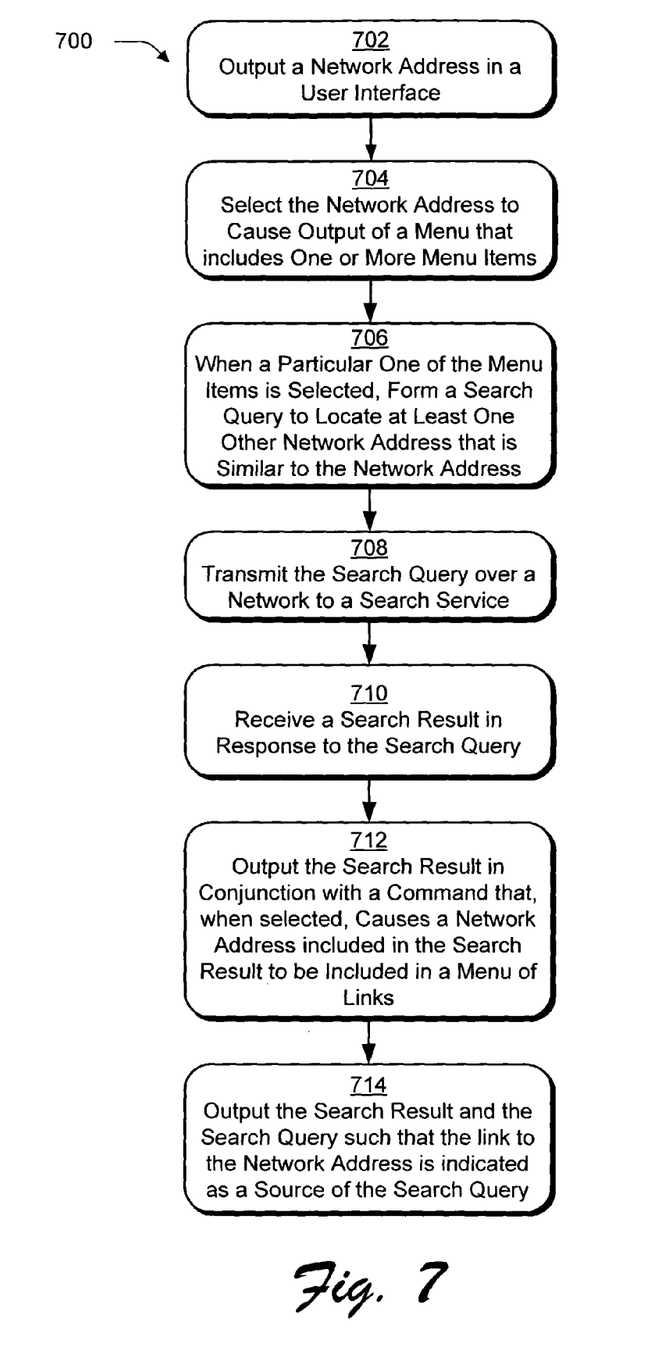
FIG. 7 is a flow diagram depicting a procedure in an exemplary implementation in which a search for content related to a network address is performed by selecting the network address.

FIG. 7 depicts a procedure 700 in an exemplary implementation in which a search for content related to a network address is performed by selecting the network address. During the discussion of the procedure 700 of FIG. 7, reference will also be made to user interfaces 800, 900 of respective FIGS. 8 and 9, which show selection of a network address to perform a search for related content and output of search results.

A network address is output in a user interface (block 702). For example, the network address may be part of content output in the user interface 800 of FIG. 8 and selectable as a link 802 to navigate to the represented address. For instance, a user may use a cursor control device to "double click" on the link 802 to obtain a web page from the represented address.

Figure 8:
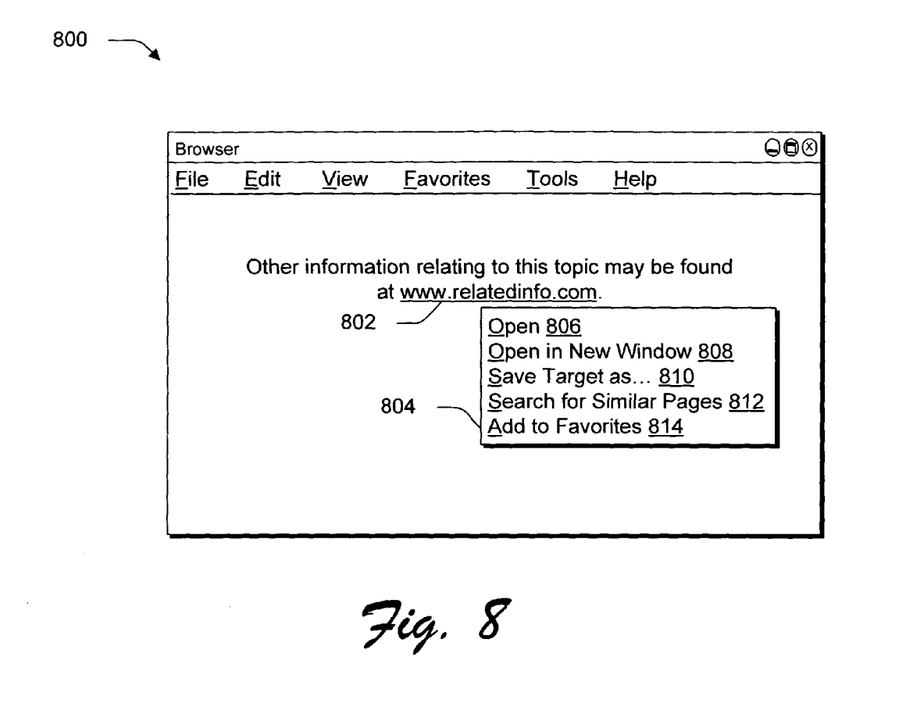
FIG. 8 illustrates a user interface in an exemplary implementation showing selection of a network address to perform a search for related content.

The network address is selected to cause output of a menu that includes one or more menu items (block 704). Continuing with the previous example, rather than double click on the link 802, the user may "right click" on the link to cause output of a menu 804. The menu 804 includes a plurality of menu items, which in this instance are commands which are selectable to perform a corresponding function, e.g., "open" 806, "open in new window" 808, "save target as" 810, "search for similar pages" 812 and "add to favorites" 814.

When a particular one of the menu items is selected, a search query is formed to locate at least one other network address that is similar to the network address (block 706). For instance, the user may select the sub-command "search for similar pages" 812 to cause a search query to be formed having the represented network address as the search term. In this instance, the search query is formed automatically such that the user does not need to manually reenter the represented network address, which may prove particularly useful when the network address is represented as a link in the user interface and does not display the actual network address. For example, instead of showing the network address "www.relatedinfo.com" in FIG. 8, the link could be implemented as text with underlining to indicate the existence of a link, e.g., as "related information" that is included within the other text of the content. A variety of other examples are also contemplated.

Figure 9:
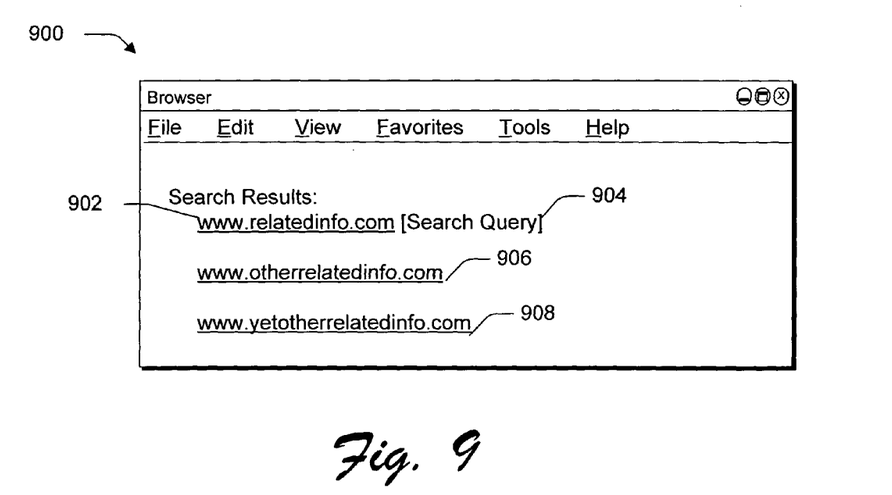
FIG. 9 illustrates a user interface in an exemplary implementation showing results of selection of a network address to perform a search of FIG. 8.

The search query is transmitted over a network to a search service (block 708) and a search result is received in response to the search query (block 710). The search result may be output in a variety of ways. For example, the search result may be output in conjunction with a command that, when selected, causes a network address included in the search result to be included in a menu of links (block 712), such as by including a selectable command "add to favorites" with each respective found similar network address. In another example, the search results and the search query are output such that the link to the network address is indicated as a source of the search query (block 714). As shown in FIG. 9, for instance, the user interface may include the original search query 902 and an indication 904 that this network address was used as the search query. Additional network addresses 906, 908 that are search results are then displayed in the user interface 900 below the network address 902 used as the search query. A variety of other techniques may also be employed to provide such indications without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving an input selecting a link to a network address;
outputting a menu in response to selection of the link to the network address, the menu having one or more menu items including:
  (1) a function that, when selected, accesses content associated with the network address and displays the content in a new window; and
  (2) a function that, when selected, causes a search query to be formed to locate at least one other network address that is similar to the network address;
receiving another input selecting the menu item that includes the function that, when selected, causes the search query to be formed; and
responsive to the receiving of the another input, forming the search query to locate at least one other network address that is similar to the network address using a network address module stored on a client, the network address module performs acts including:
  extracting contextual information from content available from one or more different network addresses stored on the client;
  determining contextual categories from the contextual information of the one or more different network addresses; and
  forming the search query based in part on the network address and at least one of the contextual categories.

2. A method as described in claim 1, wherein:
the selection of the link is performed by a user of a cursor control device; and
the link is a uniform resource locator (URL).

3. A method as described in claim 1, wherein:
the search query is configured for communication over a network to a search service; and
the search service is operable to locate the at least one other network address having content that is similar to content of the network address.

4. A method as described in claim 1, further comprising:
receiving a search result that includes the at least one other network address from a search service via a network;
outputting the search result; and
indicating that the link to the network address is a source of the search query.

5. A method as described in claim 1, further comprising:
receiving a search result that includes the at least one other network address; and
outputting the search result, the at least one other network address included in the search result having a respective command that, when selected, causes the at least one other network address to be included in a links-menu of links.

6. A method as described in claim 5, wherein the links-menu is included in a browser.

7. A method as described in claim 5, wherein the links-menu includes a list of favorite links that were specified by a user.

8. A method as described in claim 1, wherein the network address used to configure the search query is included in a menu of links within a browser.

9. A method comprising:
receiving an input that selects a menu item from a menu, the menu being displayed in response to selection of a link to a network address, the menu including:
  (1) a function that, when selected opens the network address in a new window; and
  (2) a function that, when selected, causes a search query to be formed to locate at least one other network address that is similar to the network address;
responsive to the selection of the function that, when selected, causing the search query to be formed, and forming, by a network address module stored on a client, the search query to locate at least one other network address having content that is similar to a content available from the network address, the network address module performs acts including:
  extracting contextual information from content available from client-designated network addresses resident on the client;
  determining one or more contextual categories from the contextual information of the client-designated network addresses having content that is similar to the content available from the network address; and
  forming the search query based in part on the network address and at least one of the one or more contextual categories; and
receiving a search result from a search service via a network in response to the search query.

10. A method as described in claim 9, wherein:
the selection of the link is performed by a user of a cursor control device; and
the network address is a uniform resource locator (URL).

11. A method as described in claim 9, wherein:
the search query is configured for communication over a network to a search service; and
the search service uses the search query to locate the at least one other network address.

12. A method as described in claim 9, further comprising:
outputting the search result; and
indicating that the link to the network address is a source of the search query.

13. A method as described in claim 9, further comprising:
outputting the search result, the search result having one or more network addresses each including a command that, when selected, causes a respective one of the one or more network address to be included in a menu of links.

14. A method as described in claim 13, wherein the menu of links:
is included in a browser; and
is a list of favorite links that were specified by a user.

15. A method as described in claim 9, wherein the at least one client-designated network address used to configure the search query is included in a menu of links within a browser.

16. One or more computer readable media comprising computer executable instructions that, when executed, direct a computer to:
receive an input that selects a link to a first network address;
output a pop-up menu that includes one or more menu items in response to the receiving of the selection of the link to the first network address, the one or more menu items include:
  (1) a function that, when selected, opens the first network address in a new window; and
  (2) a function that, when selected, causes a search query to be formed to locate at a second network address that is similar to the first network address;
receive a selection of the menu item including the function that, when selected, causes the search query to be formed; and
form, by a network address module stored on a client, the search query to locate the second network address having content that is similar to content available from the first network address, the network address module performs acts including:
- extracting contextual information from content available via client-designated network addresses resident on the client;
- determining one or more contextual categories from the contextual information of the client-designated network addresses having content that is related to the content available from the first network address; and
- forming the search query including at least one of the one or more contextual categories that contextually categorizes the first network address.

17. One or more computer readable media as described in claim 16, wherein:
- the search query is configured for communication over a network to a search service; and
- the search service uses the search query to locate the second network address.

18. One or more computer readable media as described in claim 16, further comprising:
- outputting a search result; and
- indicating that a link to the first network address that was selected to output the menu is a source of the search query.

19. One or more computer readable media as described in claim 16, further comprising outputting a search result and one or more network addresses included in the search result, the one or more network addresses each having a command that, when selected, causes a respective one of the one or more network address to be included in a menu of links.

20. One or more computer readable media as described in claim 16, wherein the client-designated network addresses:
- are included in a browser; and
- are a list of favorite links that were specified by a user.

* * * * *